United States Patent
Degenhardt et al.

(10) Patent No.: US 7,481,216 B1
(45) Date of Patent: Jan. 27, 2009

(54) EMERGENCY OXYGEN SYSTEM FOR AIRCRAFT PASSENGERS

(75) Inventors: Detlef Degenhardt, Stockelsdorf (DE); Günter Boomgaarden, Scharbeutz (DE); Rüdiger Meckes, Berkenthin (DE); Wolfgang Rittner, Siblin (DE)

(73) Assignee: Dae Systems GmbH, Lübeck (DE)

( * ) Notice: Subject to any disclaimer, the term of this patent is extended or adjusted under 35 U.S.C. 154(b) by 327 days.

(21) Appl. No.: 11/318,991

(22) Filed: Dec. 27, 2005

(30) Foreign Application Priority Data

Dec. 28, 2004 (DE) .................. 10 2004 063 698

(51) Int. Cl.
*A61M 11/00* (2006.01)
(52) U.S. Cl. .................. 128/204.23; 128/205.11
(58) Field of Classification Search .......... 128/202.26, 128/205.11, 205.24, 204.23, 207.18, 202.22, 128/205.23
See application file for complete search history.

(56) References Cited

U.S. PATENT DOCUMENTS

| 4,919,124 | A * | 4/1990 | Stevenson et al. ...... 128/202.26 |
| 6,371,114 | B1 * | 4/2002 | Schmidt et al. ........ 128/204.23 |
| 6,923,183 | B2 * | 8/2005 | Martinez et al. ....... 128/206.27 |
| 7,040,319 | B1 * | 5/2006 | Kelly et al. ............ 128/204.22 |
| 2003/0005933 | A1 | 1/2003 | Izuchukwu |
| 2006/0005836 | A1 * | 1/2006 | Brugnoli ................ 128/205.11 |

FOREIGN PATENT DOCUMENTS

| DE | 30 16 417 A1 | 11/1980 |
| FR | 2 455 765 | 11/1980 |
| WO | WO 98/31282 A1 | 7/1998 |
| WO | WO 2004/105881 A1 | 12/2004 |

* cited by examiner

*Primary Examiner*—Steven O Douglas
(74) *Attorney, Agent, or Firm*—McGlew & Tuttle, P.C.

(57) ABSTRACT

An emergency oxygen system is provided for aircraft passengers. The system includes at least one oxygen mask (2), with a sensor (4) for detecting at least one breathing characteristic value of a passenger using this oxygen mask (2). A control unit (10) individually determines the oxygen requirement of the passenger on account of the detected breathing characteristic value. A dosing device (8) is actuated by the control unit (10). The dosing device (8) supplies an oxygen quantity corresponding to the determined oxygen requirement, to the oxygen mask (2).

20 Claims, 1 Drawing Sheet

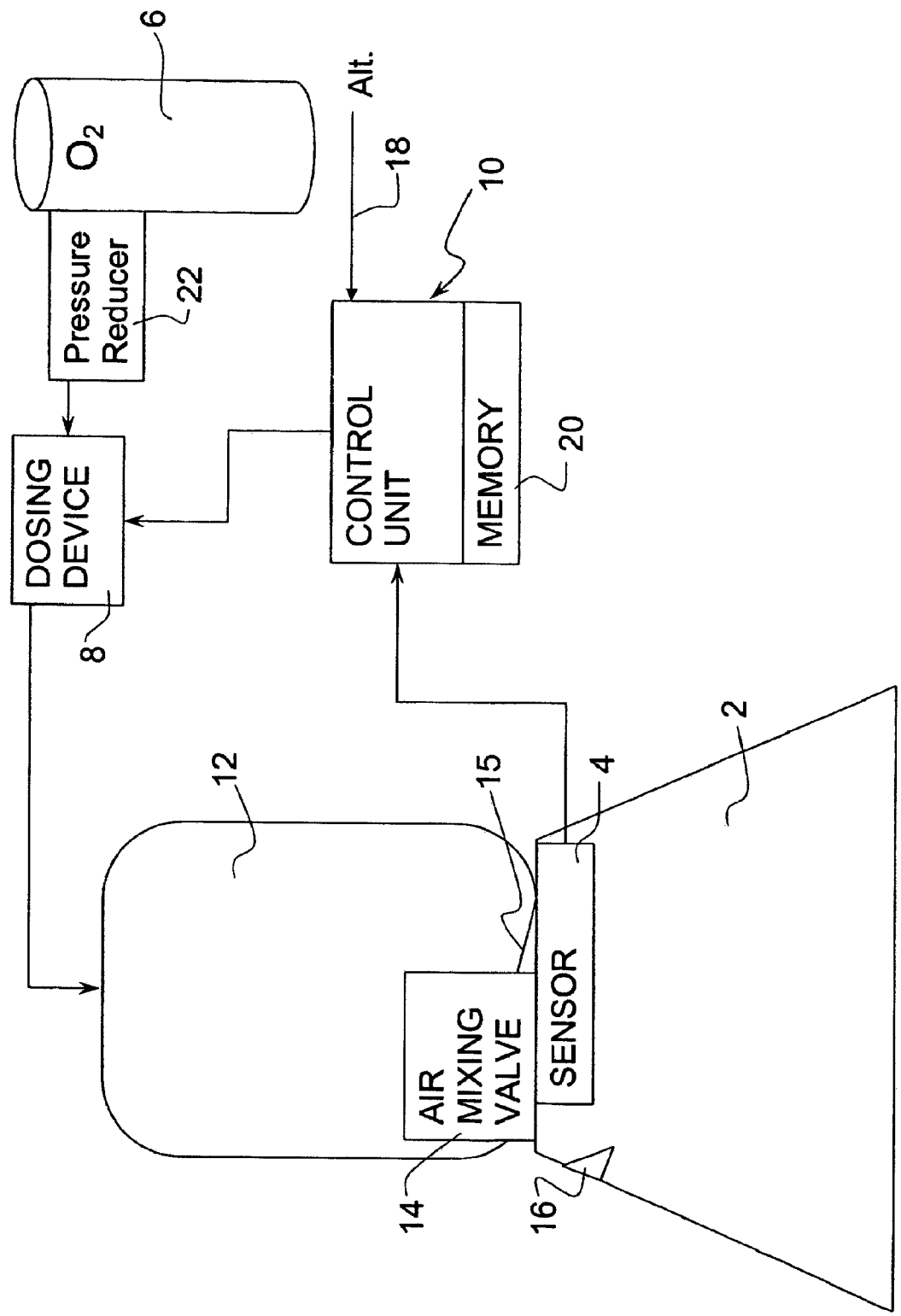

EMERGENCY OXYGEN SYSTEM FOR AIRCRAFT PASSENGERS

CROSS REFERENCE TO RELATED APPLICATIONS

This application claims the benefit of priority under 35 U.S.C. § 119 of German Patent Application DE 10 2004 063 698.2 filed Dec. 28, 2004, the entire contents of which are incorporated herein by reference.

FIELD OF THE INVENTION

The invention relates to an emergency oxygen system for aircraft passengers as well as a method for determining the oxygen requirement of an aircraft passenger with the emergency supply of oxygen, and an associated passenger oxygen mask.

BACKGROUND OF THE INVENTION

In aircrafts, emergency oxygen systems are provided for the supply of oxygen to the passengers in the case of a pressure drop. Known emergency oxygen systems comprise passenger oxygen masks which at a certain flight altitude are supplied with an oxygen quantity adapted to the flight altitude, or with an adapted oxygen flow.

With regard to greater flight altitudes and new flight paths, an extended oxygen supply to the passengers is to be provided in the case of emergency. This means that larger oxygen quantities must be made available.

SUMMARY OF THE INVENTION

It is the object of the invention to provide an emergency oxygen system which permits the reduction of the oxygen quantity which is to be held ready or which is to be made available.

According to the invention, an emergency oxygen system is provided for aircraft passengers. The system comprises an oxygen mask and a sensor means for detecting at least one breathing characteristic value of a passenger using this oxygen mask. A control means is provided which individually determines the oxygen requirement of the passenger on account of the acquired breathing characteristic value. A dosing means is actuated by the control means. The dosing means supplies an oxygen quantity corresponding to the determined oxygen requirement to the oxygen mask.

According to another aspect of the invention a method for determining the oxygen requirement of an aircraft passenger is provided with the aircraft having an emergency oxygen supply. The method comprises detecting a breathing characteristic value of the passenger and determining the individual oxygen requirement of the passenger on the basis of the detected breathing characteristic value.

According to another aspect of the invention a passenger oxygen mask is provided for an emergency oxygen supply. The mask comprises a mask body, a breathing bag and an air mixing valve. A sensor is further provided for detecting the vacuum acting on the air mixing valve in the inside of the oxygen mask.

The invention is based on the idea of individually determining the oxygen requirement for each passenger and to accordingly adapt the oxygen quantity which is supplied to an oxygen mask for the passenger using this mask. This permits the oxygen quantity for the individual passenger to be reduced to the required quantity. It is thus no longer necessary to supply the passenger oxygen mask with an oxygen quantity which is adapted to an average or largest possible requirement. I.e., according to the invention, it is possible to lead less oxygen to a smaller passenger who has a lower oxygen requirement, than to a large passenger who has a greater oxygen requirement. The oxygen quantity to be held ready or to be made available may be reduced by the individual adaptation of the oxygen supply to the requirements of each individual passenger.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The only FIGURE is a schematic view showing the system according to the invention and the passenger oxygen mask according to the invention.

DESCRIPTION OF THE PREFERRED EMBODIMENTS

Referring to the drawings in particular, the adaptation of the oxygen supply to the individual requirements of the passenger is effected according to the invention in that at least one oxygen mask 2, as well as a sensor means or sensor 4 for detecting at least one breathing characteristic value of a passenger using this oxygen mask 2, is provided in the emergency oxygen system. In the normal case, the emergency oxygen system comprises a multitude of oxygen masks 2, i.e. at least one for each passenger, wherein a sensor means is allocated to each oxygen mask 2 and detects at least one breathing characteristic value of the passenger who currently uses the associated oxygen mask 2. Furthermore, according to the invention, a control means or control unit 10 is provided which individually determines the oxygen requirement of the passenger on account of the detected breathing characteristic value. With this, preferably an individual control means 10 is allocated to each oxygen mask 2. It is alternatively possible to provide a central control means 10 which cooperates with the sensor means of several oxygen masks 2. On account of the breathing characteristic value, the control means 10 determines or computes the oxygen requirement of the passenger who uses the oxygen mask 2, and actuates or controls or regulates (closed-loop control) a dosing means 8 via which the oxygen mask 2 is then supplied with an oxygen quantity corresponding to the evaluated oxygen requirement. The dosing means 8 may for example be a magnet valve. The breathing characteristic value to be determined is preferably a characteristic value which is characteristic of the depth of breathing or the volume of the lungs of the passenger. A larger lung volume usually needs to be supplied with a larger oxygen quantity than a small lung volume. In this respect, the volume of the lungs is characteristic of the oxygen requirement of the passenger.

Preferably the quantity of the oxygen which is inhaled by the passenger is detected as a breathing characteristic value. The detection of the oxygen quantity which is actually inhaled permits the control means 10 of the respective oxygen mask 2, by way of the dosing means 8, to supply a quantity of oxygen which corresponds as accurately as possible to the actually inhaled oxygen quantity, so that the quantity of excessively supplied oxygen may be reduced, or an excess supply of oxygen may be largely avoided.

The sensor means 4 as a breathing characteristic value further preferably detects the breathing speed of the passenger using the respective oxygen mask 2. The breathing speed represents a characteristic breathing characteristic value, since it is assumed that large lungs produce a higher flow or a higher flow speed, i.e. a larger breathing speed and shorter inhalation time, which correlate to the individual size of the lungs or the depth of breathing. The control means 10 by way of predefined algorithms or tables determines the actual oxygen requirement of the respective passenger on the basis of the detected breathing speed.

The control means 10 for this and by way of the sensor means 4, as a breathing value, preferably detects the time within which the passenger inhales a predefined oxygen volume. The detection of the inhalation time for a predefined oxygen volume provides a characteristic value for the size of the lungs, since as stated, it is assumed that a large lung inhales the predefined volume more quickly than a small lung. Accordingly, the control means 10 then with a shorter inhalation time, by way of the dosing means 8 of the oxygen mask 2, supplies a larger quantity of oxygen than with a larger detected inhalation time. This means that preferably with a large breathing speed, a larger quantity of oxygen is made available to the passenger than with a small breathing speed.

With the emergency oxygen system according to the invention, preferably one breathing bag 12 is provided on the oxygen mask 2. Such a breathing bag 12 preferably forms the predefined oxygen volume for which the inhalation time of the passenger is measured or detected by way of the sensor means 4.

The sensor means 4 preferably comprises at least one sensor which detects the beginning and end of a breathing pulse of the passenger. If the quantity of air or oxygen which is inhaled between the two detected points in time is known, one may then deduce the depth of breathing or lung size of the passenger, since a larger lung inhales a certain quantity of air or oxygen in a smaller time. Preferably, a pressure sensor is applied as the sensor 4, which reacts to vacuum pulses in the inside of the oxygen mask 2, which are created by the passenger on inhalation.

The oxygen mask 2 further preferably comprises an air mixing valve 14 which is open to the environment and permits the passenger to inhale the air of the surroundings apart from the prepared oxygen 6. The air of the surroundings is mixed with the oxygen in the inside of the oxygen mask 2, or the passenger breathes oxygen and the air of the surroundings in an alternating manner. Furthermore, the oxygen mask 2 in the known manner may comprise an inhalation valve 15 which is preferably arranged on the output side of a breathing bag 12, as well as a exhalation valve 16.

The sensor means 4 preferably comprises a sensor arranged on the air mixing valve 14 for detecting the vacuum acting on the air mixing valve 14. On inhaling, a vacuum is produced in the oxygen mask 2, wherein the air mixing valve 14 which is held by biasing in its closed position, is opened depending on the intensity of the vacuum. The biasing may be produced for example by way of a spring. The air mixing valve 14 opens if the force acting on the air mixing valve 14 due to the vacuum exceeds the biasing force. The sensor is preferably designed such it does not wait until the opening of the air mixing valve 14 to emit a signal, but already when a vacuum pulse in the inside of the oxygen mask 2 acts on the air mixing valve 14, even if this valve firstly still remains closed. The beginning of a breathing pulse may be detected by the sensor means 4 in this manner. The sensor may be designed as an electrical contact on the air mixing valve 14.

Such a sensor for example permits the evaluation of a breathing characteristic value in the following manner. With the initial or first inhalation of the passenger, then firstly a vacuum is produced in the oxygen mask 2, which is detected by the electrical contact on the air mixing valve 14. Thereupon, firstly a breathing bag 12 preferably provided on the oxygen mask 2 is filled. The inhalation valve which closes the breathing bag 12 to the oxygen mask 2 is designed such that with a slight vacuum in the oxygen mask 2, it already opens before the air mixing valve 14. In this way, it is ensured that the air mixing valve 14 firstly remains closed and firstly that the inhalation valve is opened, so that the passenger firstly breaths in the oxygen from the breathing bag 12. If the breathing bag 12 is emptied, the vacuum in the oxygen mask 2 increases on account of the lacking supply of oxygen through the inhalation valve, so that now the air mixing valve 14 is also opened, which in turn is registered by the electrical contact on the air mixing valve 14. This means that the breathing bag 12 has been breathed empty by the passenger between the signals delivered by the sensor on the air mixing valve 14. One may determine the breathing speed by way of detecting the time between these signals, i.e. a characteristic value of the lung which is individual to the passenger, from which one may deduce the volume of the lungs, wherein, as specified above, it may be assumed that a larger lung inhales the defined oxygen volume present in the breathing bag 12 more quickly than a small lung.

The control means 10 preferably comprises a data memory 20 in which predefined values for the oxygen requirement of a passenger which are allocated to individual breathing characteristic values are deposited. The data memory 20 thus preferably contains a software table in which individual breathing characteristic values for the oxygen requirement is stored. These values stored in the data memory may be determined by way of statistic field trials, wherein, as the case may be, the exact oxygen requirement for a certain breathing characteristic value may be determined by the control means 10 by way of interpolation or extrapolation, on the basis of oxygen requirement values deposited in the data memory 20.

The control means 10 when determining the individual oxygen requirement of a passenger particularly preferably additionally takes the flight altitude 18 into account. For this, several oxygen requirement values corresponding to different flight altitudes may be deposited in the data memory 20 of the control means 10 for each breathing characteristic value. Thus the control means 10 then from the table deposited in the data memory may read out an associated oxygen requirement value in dependence on a certain flight altitude and on a certain breathing characteristic value, and accordingly actuate the dosing means 8, in order to supply this quantity of oxygen to the breathing mask. It is possible for the control means 10 to interpolate or extrapolate exact values from stored values, also with regard to the flight altitude 18.

The dosing means 8 preferably doses the oxygen quantity supplied to the oxygen mask 2 by way of variation of the pressure and/or time. The dosing means 8 is preferably a magnet valve which is opened and closed in a pulsed manner, wherein the supplied quantity of oxygen may for example be varied by way of the pulse length or the pulse frequency. It is further possible to vary the pressure of the supplied oxygen.

The invention further relates to a method for evaluating the individual oxygen requirement of an aircraft passenger with an emergency oxygen supply, which permits the provision to the passenger of only that quantity of oxygen which the passenger actually requires, so that an excess supply of oxygen is prevented or may be minimized. For determining the individual oxygen requirement, firstly an individual breathing characteristic value of the passenger using the oxygen mask 2 is evaluated. This breathing characteristic value is preferably characteristic of the depth of breathing or the lung capacity. As such a breathing characteristic value, one may preferably detect the breathing speed, i.e. in particular the time in which a certain volume of air or oxygen is inhaled. Then the individual oxygen requirement is evaluated on the basis of the detected breathing characteristic value, wherein for example a larger lung volume or a larger breathing speed is characteristic of a higher oxygen requirement than a detected smaller lung volume. Then only the actually required quantity of oxygen according to the evaluated individual oxygen requirement is accordingly supplied to the passenger or the passenger's oxygen mask 2 in the emergency oxygen supply.

Preferably, the breathing speed and/or the breathing volume per breathing pulse is detected as a breathing characteristic value.

The detected breathing characteristic value is preferably allocated to a lung characteristic value which is individual to the passenger and which for example characterizes a certain lung volume. Then, on account of the lung characteristic value, one may then determine a certain oxygen requirement of the passenger by way of stored tables.

It is further preferable for the oxygen requirement of the passenger to be allocated to the lung characteristic value in dependence on the flight altitude, i.e. several oxygen requirement values are allocated to each lung characteristic value in dependence on certain flight altitudes which likewise may be stored in a table in advance.

The invention further relates to a passenger oxygen mask 2 for an emergency oxygen supply which may be applied with the previously described emergency oxygen system or the previously described method. The passenger oxygen mask 2 comprises a breathing bag 12 as well as an air mixing valve 14 through which mixed air may flow into the oxygen mask 2 from the surroundings. A sensor for detecting the vacuum acting on the air mixing valve 14 in the inside of the oxygen mask 2 is provided on the air mixing valve 14. Such a sensor may be used to detect the beginning and the end of a breathing pulse of the passenger and in particular the beginning and end of the inhalation of the oxygen volume provided in the breathing bag 12 when inhaling for the first time. The breathing bag 12, as already described above, is connected to the oxygen mask 2 via an inhalation valve, wherein the inhalation valve opens already with a smaller vacuum than with the air mixing valve 14, by which means it is ensured that at the beginning of the inhalation procedure, firstly the oxygen is inhaled from the breathing bag 12. Firstly however, a vacuum occurs in the oxygen mask 2 on breathing in for the first time, which also acts on the air mixing valve 14, so that a contact or sensor attached there may detect this vacuum pulse. Thereupon, the breathing bag 12 is filled with oxygen. Subsequently, the inhalation valve firstly opens, by which means the vacuum in the oxygen mask 2 is firstly reduced again and thus also the vacuum acting on the air mixing valve 14. This may in turn be detected by the sensor or contact attached there, in that the contact is released, so that no further signal is emitted by the sensor. If the breathing bag 12 is emptied by breathing, the vacuum in the breathing mask increases again, so that the air mixing valve 14 opens and the sensor or contact attached there again emits a signal which thus displays that the breathing bag 12 has been emptied by breathing.

Once again, a preferred embodiment example of the invention is described hereinafter. With this embodiment, an oxygen half-mask with a breathing bag 12, an inhalation valve, an exhalation valve and an air mixing valve 14 is provided. The air mixing valve 14 is provided with an electrical contact which with the initial inhalation produces an electrical signal which is led to an electronic control apparatus. Thereby, this air mixing valve 14 firstly continues to remain closed. The electronic control apparatus in dependence on the flight altitude and the depth of breathing of the passenger, produces an electrical pulse which opens a valve for a certain pulse duration and permits a certain oxygen quantity/initial oxygen pulse to flow into the breathing bag 12. This initial oxygen pulse thereby is preferably selected so large that a hypoxia may be prevented, certainly for flight altitudes of up to 40,000 ft.

The valve is preferably designed as a magnet valve and is supplied with oxygen by an oxygen supply 6 or oxygen supply system, e.g. via a pressure tank 6 with a pressure reduction means or pressure reducer 22. As soon as the breathing bag 12 has been emptied by breathing, the air mixing valve 14 opens and a second signal is produced by the electrical contact with is attached there. The measured or computed time (averaged over an adequately long period, e.g. 30 seconds) between the pulse start, i.e. the first air mixing valve 14 signal and the second air mixing valve 14 signal correlates to the inhalation time of the pulsed-in oxygen quantity which is individual to the passenger, i.e. of the initial oxygen pulse (as the case may be, correlated in altitude). The value which is then computed by the control apparatus represents the characteristic value of the lung in liters per minute, which is individual to the passenger. These lung characteristic values which are computed for the individual passenger, correlate to specific minute breathing volumes which have been evaluated with an adequate accuracy via static field trials in advance. With the knowledge of the lung size or the individual lung characteristic value of the breathing passenger, one may then compute the oxygen quantity which is now necessary at certain altitudes. These values are present by way of software tables. The result is that the suitable oxygen pulse is computed and is dispensed into the breathing bag 12. This oxygen pulse size may be varied by way of pressure and time variation.

This procedure is repeated preferably in a cyclic manner in dependence on the breathing frequency and the flight altitude, e.g. every five minutes, so that changing altitudes and for example also an exchange of the breathing mask to another passenger is detected, and the oxygen quantity which is led to the breathing mask may be adapted accordingly.

Furthermore in dependence on the current flight altitude, the determined pulse is accordingly varied in a breathing-psychological manner in order to prevent hypoxia. The table values which are required for this, with regard to the software, may be deposited in the control means 10 or the control apparatus. The flight altitude is detected via an altitude signal by the aircraft data system or via an integrated local altitude sensor.

The basic principle according to the invention accordingly lies in setting the pulse length of the oxygen supply to an oxygen mask 2 in dependence on the individual depth of breathing of the passenger and preferably on the flight altitude. Thereby, the depth of breathing is preferably detected by way of measuring the emptying times for a certain oxygen quantity in the breathing bag 12. The opening of the air mixing valve 14 in the oxygen mask 2 may thereby be used for activating the pulse. The first signal generates the first pulse, the second signal generates the second pulse and is simultaneously the stop time for the first inhalation-, breathing depth measurement, etc.

While specific embodiments of the invention have been shown and described in detail to illustrate the application of the principles of the invention, it will be understood that the invention may be embodied otherwise without departing from such principles.

What is claimed is:

1. An emergency oxygen system for aircraft passengers, the system comprising:
    one of a plurality of oxygen masks;
    a sensor means for detecting at least one breathing characteristic value of a passenger using said one of a plurality of oxygen masks;
    a control means for determining the oxygen requirement of the passenger based on the detected breathing characteristic value; and
    a dosing means actuated by said control means for supplying a customized oxygen quantity corresponding to the determined oxygen requirement to the one of a plurality of oxygen masks.

2. An emergency oxygen system according to claim 1, wherein said at least one breathing characteristic value corresponds the quantity of the oxygen which is breathed in by the passenger.

3. An emergency oxygen system according to claim 1, wherein said at least one breathing characteristic value corresponds to the breathing speed of the passenger.

4. An emergency oxygen system according to claim 1, wherein said at least one breathing characteristic value corresponds to the time within which the passenger inhales a predefined oxygen volume, said control means receiving said at least one characteristic value via said sensor means.

5. An emergency oxygen system according to claim 1, wherein a breathing bag is provided on the oxygen mask.

6. An emergency oxygen system according to claim 1, wherein said sensor means comprises at least one sensor which detects the beginning and the end of a breathing pulse of the passenger.

7. An emergency oxygen system according to claim 1, wherein said oxygen mask comprises an air mixing valve.

8. An emergency oxygen system according to claim 7, wherein said sensor means comprises a sensor arranged on the air mixing valve, said sensor detecting the vacuum acting on the air mixing valve.

9. An emergency oxygen system according to claim 1, wherein said control means comprises a data memory, said data memory receiving predefined values for the oxygen requirement of a passenger which are allocated to individual breathing characteristic values.

10. An emergency oxygen system according to claim 1, wherein said control means receives flight altitude data, said control means determining the individual oxygen requirement of a passenger based on said flight altitude data and said at least one breathing characteristic.

11. An emergency oxygen system according to claim 1, wherein said dosing means doses the oxygen quantity supplied to the oxygen mask via pressure variation and/or time variation.

12. A method for determining a customized oxygen requirement of an aircraft passenger with an emergency oxygen supply, the method comprising the steps of:
    providing one of a plurality of oxygen masks with a sensor;
    detecting with said sensor a breathing characteristic value of the passenger; and
    determining the customized oxygen requirement of the passenger based on the detected breathing characteristic value.

13. A method according to claim 12, wherein the breathing characteristic value is the breathing speed and/or the breathing volume per breathing pulse.

14. A method according to claim 12, wherein a lung characteristic value which is individual to the passenger is allocated to the breathing characteristic value, for determining the oxygen requirement.

15. A method according to claim 14, wherein a certain oxygen requirement of the passenger is allocated to the lung characteristic value by way of stored tables.

16. A method according to claim 14, wherein an oxygen requirement of the passenger is allocated to the lung characteristic value based on the flight altitude.

17. A passenger oxygen mask for an emergency oxygen supply including a plurality of passenger oxygen masks, each mask comprising:
    a mask body;
    a breathing bag;
    an air mixing valve; and
    a sensor for detecting a vacuum acting on the air mixing valve, by the passenger, disposed within an interior of the oxygen mask for customizing a supply of oxygen to each mask.

18. A passenger oxygen mask according to claim 17, further comprising:
    a dosing device supplying oxygen to said breathing bag, said vacuum corresponding to a lung capacity volume of a passenger;
    a control unit programmed to regulate a flow of oxygen from said dosing device to the passenger based on said vacuum detected via said sensor such that said dosing device delivers an amount of oxygen to the passenger corresponding to said lung capacity volume of the passenger.

19. A method according to claim 12, further comprising the steps of:
    providing a dosing device;
    providing a control unit;
    supplying oxygen to the passenger via said dosing device;
    regulating a flow of said oxygen from said dosing device to the passenger with said control unit such that the passenger receives aid individual oxygen requirement, said breathing characteristic value corresponding to a lung capacity value of the passenger.

20. A passenger oxygen mask according to claim 18, wherein said sensor is located on said mask body, said control unit receiving flight altitude data, said control unit regulating said flow of oxygen from the dosing device to the passenger based on said vacuum detected via said sensor and said flight altitude data.

* * * * *